United States Patent
Hutchinson et al.

(10) Patent No.: US 7,344,329 B2
(45) Date of Patent: Mar. 18, 2008

(54) ADJUSTABLE RISER FOR A MOTORCYCLE

(75) Inventors: Ron Hutchinson, Brookfield, WI (US);
Frank Pruss, Milwaukee, WI (US);
Steve Zenge, Glendale, WI (US);
James Richard Schiltz, Hickory, NC (US); Wyatt Fuller, Hickory, NC (US);
Jay M. Klubertanz, Hartford, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 357 days.

(21) Appl. No.: 11/121,642

(22) Filed: May 4, 2005

(65) Prior Publication Data
US 2008/0006118 A1 Jan. 10, 2008

(51) Int. Cl.
B62K 21/22 (2006.01)

(52) U.S. Cl. .......... 403/109.1; 403/377; 280/279; 74/551.3

(58) Field of Classification Search .......... 180/219; 280/279, 280; 403/109.1–109.7, 377–379.6; 74/551.3–551.7
See application file for complete search history.

(56) References Cited

U.S. PATENT DOCUMENTS 4,023,436 A * 5/1977 Dodge .......... 74/551.3
4,260,171 A * 4/1981 Foster .......... 280/279
5,829,316 A 11/1998 Krizman, Jr.
6,035,741 A 3/2000 Krizman, Jr.
6,176,503 B1 * 1/2001 George .......... 280/274
2003/0084746 A1 5/2003 Cutsforth
2004/0016316 A1 1/2004 Bechler

FOREIGN PATENT DOCUMENTS

DE 44 45 204 6/1996
EP 1561678 A1 * 8/2005
EP 1792813 A1 * 6/2007
JP 2005247296 A * 9/2005

OTHER PUBLICATIONS

Kuryakyn; Handlebars Page; website; Apr. 21, 2005; http://www.kuryakyn.com/category.asp?bn=harley&cn=Handlebars; 1 page.
Kuryakyn; Product Page; Adjustable Risers; website; Apr. 21, 2005; http://www.kuryakkyn.com/products.asp?bn=harley&ci=3470; 1 page.

* cited by examiner

*Primary Examiner*—Kevin Hurley
(74) *Attorney, Agent, or Firm*—Michael Best & Friedrich LLP (57) ABSTRACT

A riser for a motorcycle having a front wheel coupled to a steering assembly that is movable to pivot the front wheel and steer the motorcycle. The riser includes a first portion that is adapted to be coupled to the steering assembly and defines an axis. A carrier is adapted to engage the handlebar such that the carrier and the handlebar are fixedly attached to one another. The carrier is movably coupled to the first portion such that the carrier is movable along the axis.

19 Claims, 11 Drawing Sheets

ADJUSTABLE RISER FOR A MOTORCYCLE

BACKGROUND

The present invention relates to a riser that supports the handlebars of a motorcycle. More particularly, the invention relates to an adjustable riser that supports the handlebars of a motorcycle and allows for height adjustment of the handlebars.

Motorcycles include a front wheel and a rear wheel that rotate about separate axles. The front wheel is supported by a steering assembly that allows the rider to pivot the wheel to steer the motorcycle as the motorcycle moves. Typically, handlebars engage the steering mechanism and include handgrips that extend to convenient locations for the rider. The rider then holds the handgrips and moves the handlebars to steer the motorcycle.

Many motorcycles include steering assemblies the have risers that provide a connecting point for the handlebars. The risers extend beyond the steering assembly and engage the handlebars with a clamp. Although the angular position of the handlebars is variable relative to the clamp, the height of the risers are fixed with respect to the steering assembly. This can result in handlebars that are too high or too low for a particular rider. Handlebars that are not ideally positioned can result in rider discomfort.

SUMMARY

The present invention provides a riser that attaches a handlebar to a steering assembly and also allows for height adjustment of the handlebar. The riser includes a first portion that is fixedly attached to the steering assembly and a second portion that is fixedly attached to the handlebar portion. A locking mechanism interconnects the first and second portions and is movable between an engaged position and a disengaged position. When in the engaged position, the position of the handlebars is fixed with respect to the steering assembly. When the locking mechanism is moved to the disengaged position, the handlebars are movable with respect to the steering assembly, thus allowing the rider to adjust the height of the handlebars.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
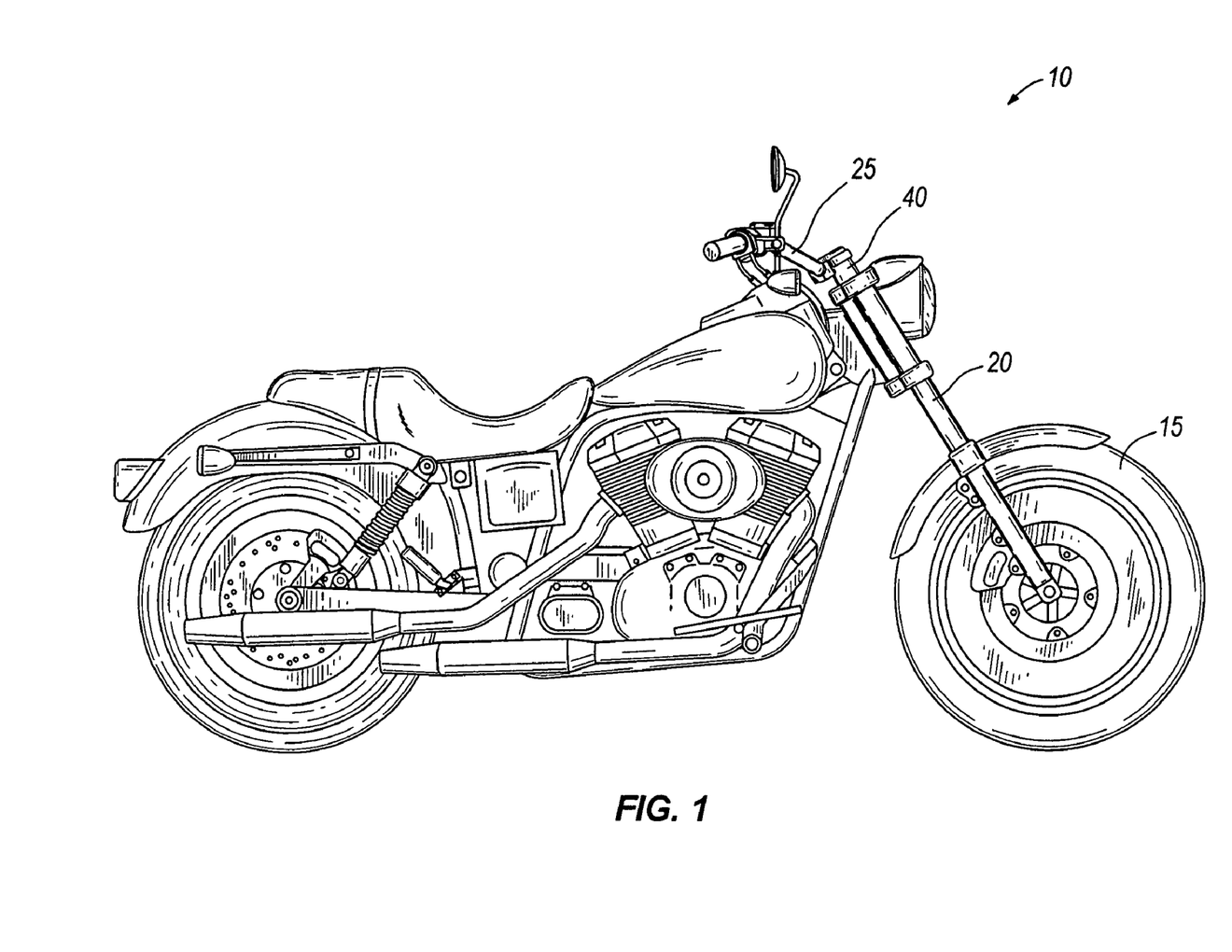
FIG. 1 is a side view of a motorcycle including handlebars supported by risers embodying the present invention.

FIG. 1 illustrates a motorcycle 10 that includes a front wheel 15, a front steering assembly 20, and a pair of handlebars 25. The front steering assembly 20 supports the front wheel 15 so that it is free to spin about an axle during forward motion of the motorcycle 10. The steering assembly 20 is coupled to the remainder of the motorcycle 10, as is well known in the motorcycle art, to allow the steering assembly 20 to rotate about a steering axis 30. Rotation about the steering axis 30 pivots the front wheel 15 to steer the motorcycle 10.

Figure 2:
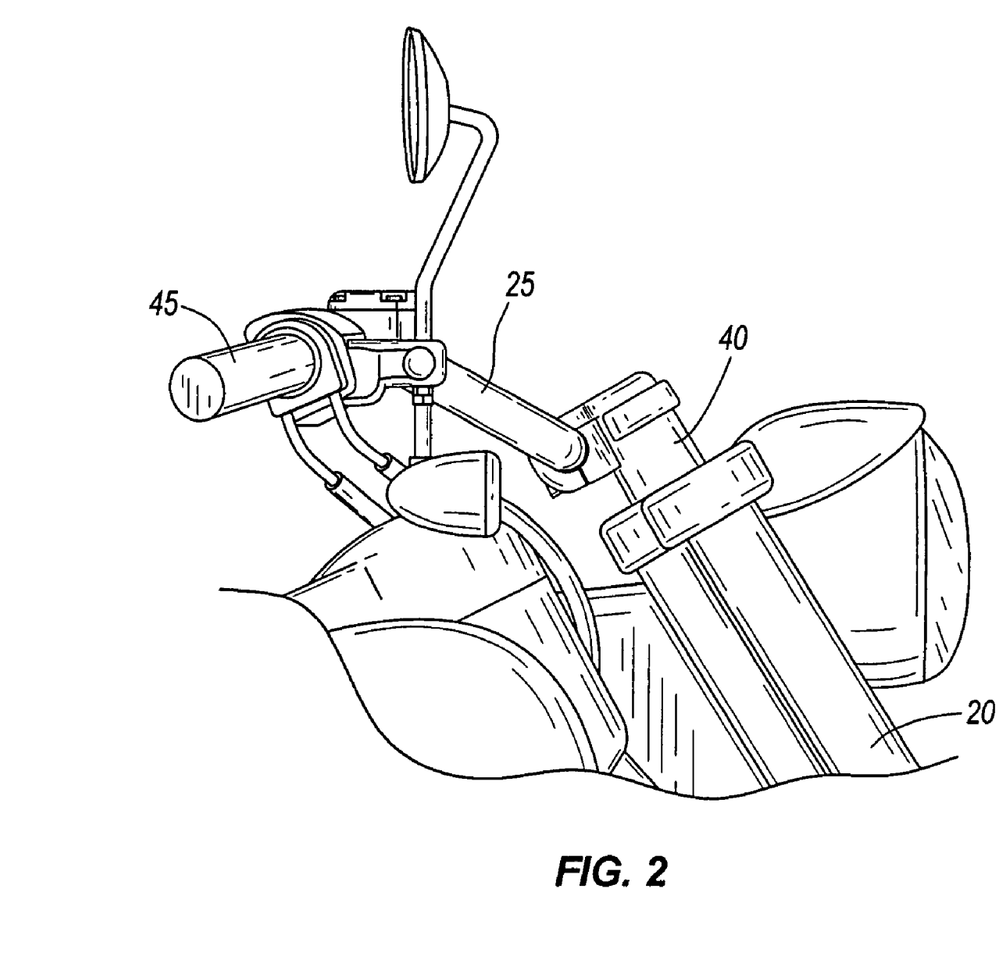
FIG. 2 is an enlarged side view of the handlebars and risers of FIG. 1.
Figure 3:
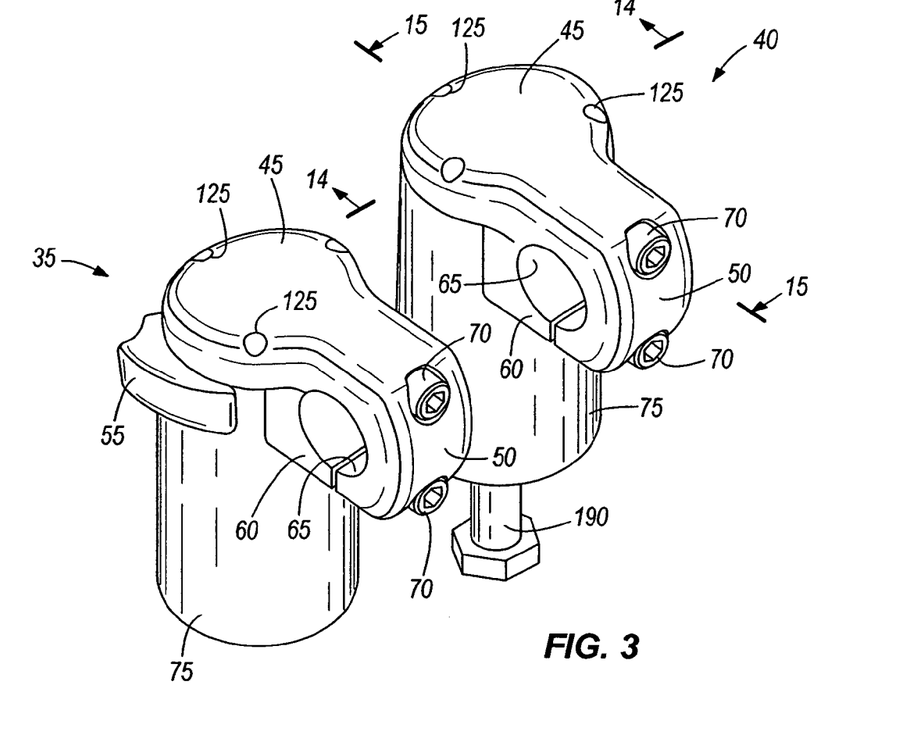
FIG. 3 is a perspective view of the risers of FIG. 1 with the handlebars removed.
Figure 4:
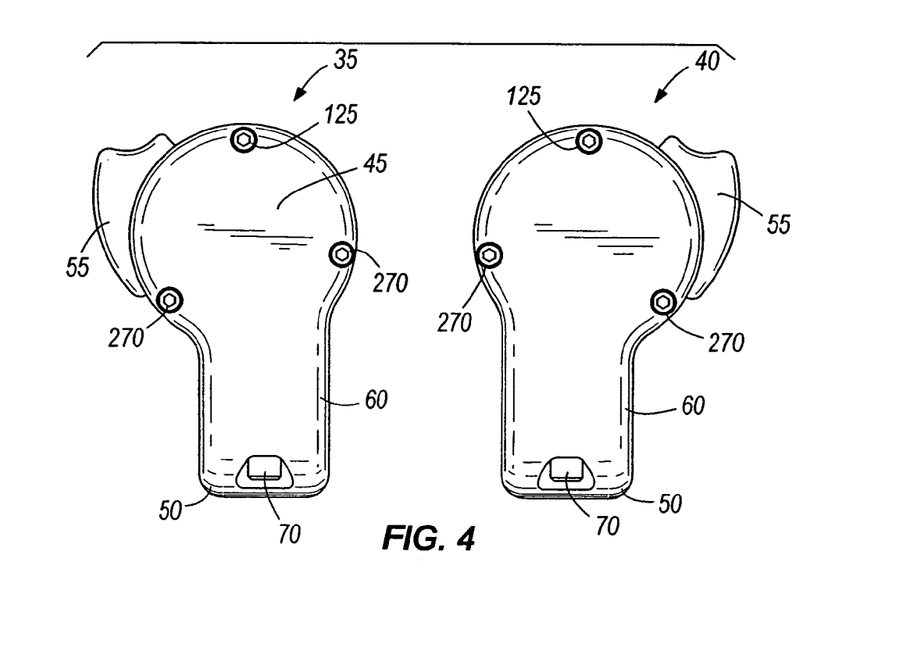
FIG. 4 is a top view of the risers of FIG. 1 with the handlebars removed.

As illustrated in FIGS. 2-4, the handlebars 25 are connected to the steering assembly 20 via a left riser 35 and a right riser 40. The handlebars 25 include handgrip portions 45 that are grabbed by the rider to allow the rider to move the handlebars 25 and steer the motorcycle 10. Before proceeding, it should be noted that most motorcycles 10 employ a single bar that defines the handlebars 25. Thus, while the term "handlebars" is used herein, one of ordinary skill will realize that a single tube could be bent to the desired shape to completely define the handlebars 25. Thus, the term "handlebars" should not be read as requiring two separate components.

With reference to FIGS. 3 and 4, the risers 35, 40 are illustrated apart from the remainder of the motorcycle 10. Each riser 35, 40 includes a carrier 45, a clamp 50, and a lever 55. The carrier 45 includes an extension 60 that cooperates with the clamp 50 to define a handlebar-receiving aperture 65. The handlebars 25 extend through the apertures 65 and are clamped into position using the clamp 50. Two bolts 70 pass through each clamp 50 and thread into the extension 60 to allow the clamp 50 and carrier 45 to clamp the handlebars 25 to the risers 35, 40. Thus, the handlebars 25 are fixedly attached to the carrier 45 and clamp 50. Generally, the handlebars 25 are considered to be fixed and not movable relative to the carrier 45 and clamp 50. However, as one of ordinary skill in the art will realize, the handlebars 25 can be pivoted with respect to the carrier 45 and clamp 50 by loosening the clamp 50.

As shown in FIG. 4, the levers 55 extend from the risers 35, 40 in opposite directions. Specifically, the lever 55 on the right riser 40 extends to the right (i.e., away from the left riser 35) while the left lever 55 extends to the left (i.e., away from the right riser 40). Thus, the left riser 35 and the right riser 40 are not identical. Rather, they are mirror images of one another. Of course other constructions could employ risers 35, 40 that are identical if desired.

Figure 5:
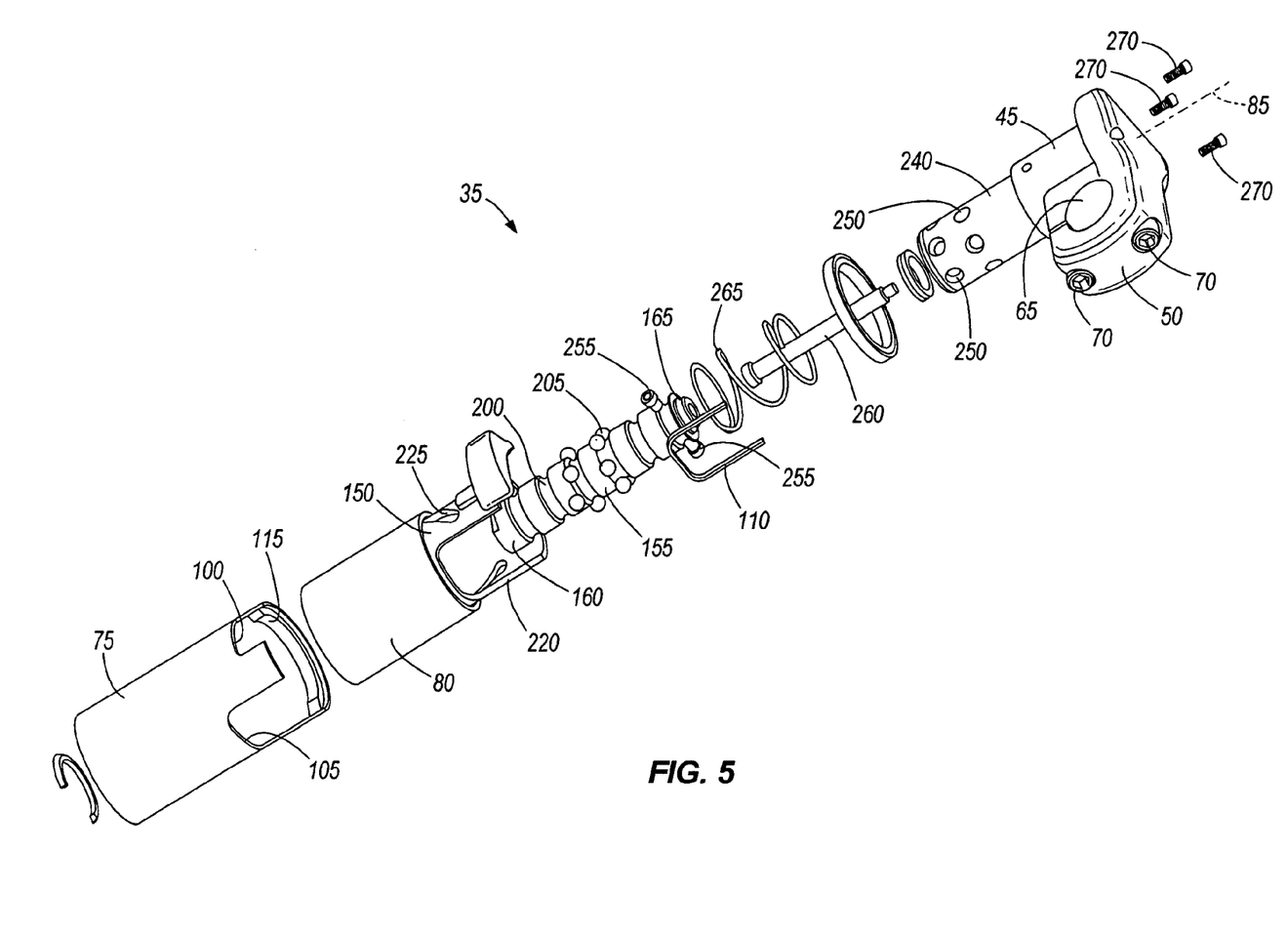
FIG. 5 is an exploded perspective view of the left side riser of FIG. 3.
Figures 6, 7:
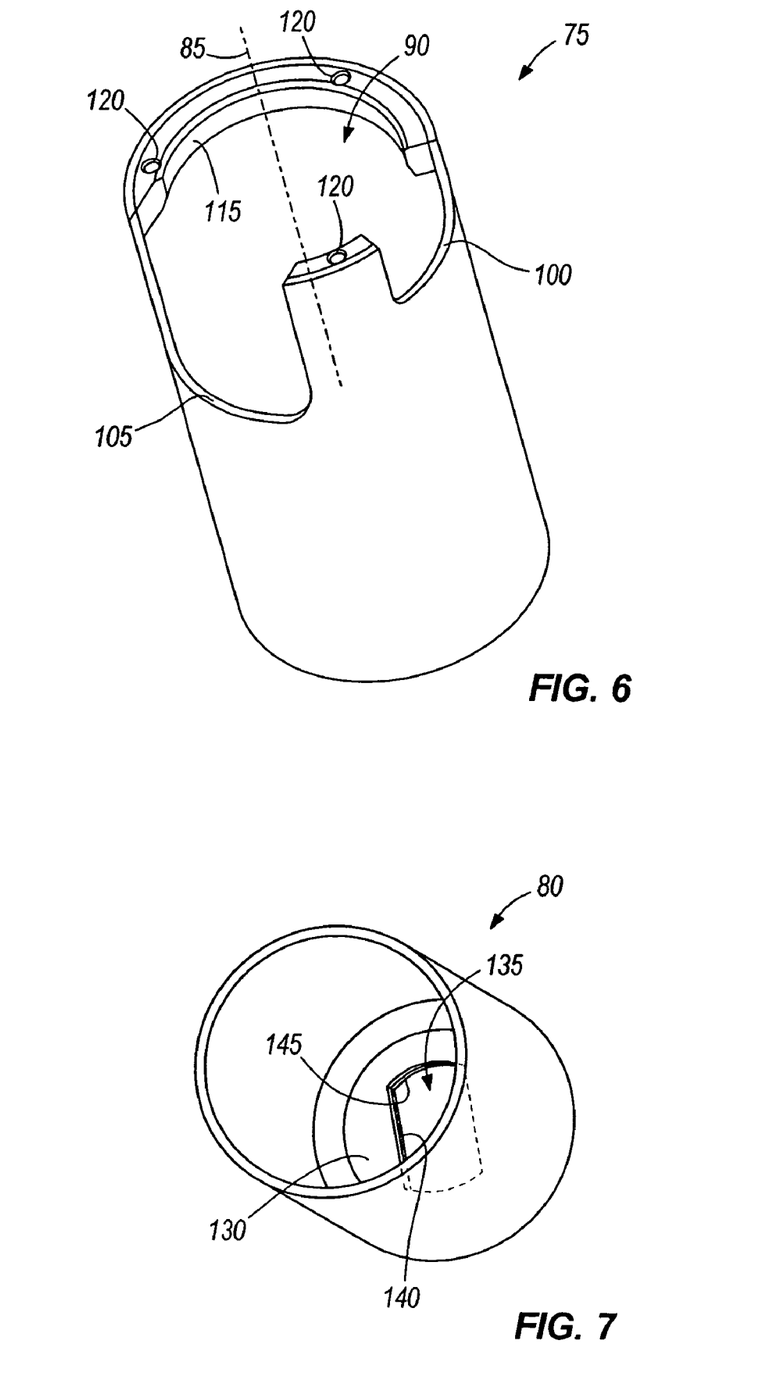
FIG. 6 is a perspective view of an outer cover of the right side riser of FIG. 3.
FIG. 7 is a perspective view of an inner cover of the right side riser of FIG. 3.

FIG. 5 illustrates the left riser 35 in an exploded condition to better illustrate the various components. The riser 35 includes an outer cover 75 and an inner cover 80 that fits within the outer cover 75. The outer cover 75, illustrated in more detail in FIG. 6, is a substantially cylindrical tube that defines a riser axis 85 and includes a top aperture 90 and a bottom aperture 95. Both the top and bottom apertures 90, 95 are large enough to allow for the passage of the inner cover 80. A U-shaped lever slot 100 is formed in the outer cover 75 adjacent the top aperture 90. The lever slot 100 is sized to receive the lever 55 and allow for movement of the lever 55 about the riser axis 85. A U-shaped extension slot 105 is also formed in the outer cover 75 adjacent the top aperture 90. The extension slot 105 is wider and deeper than the lever slot 100 and is sized to receive the extension portion 60 of the carrier 45. In many constructions, a seat or seal 110 is attached to the perimeter of the extension slot 105 to provide a cushion between the extension 60 and the outer cover 75. A flange 115 extends around at least a portion of the perimeter that defines the top aperture 90. The flange 115 includes threaded apertures 120 that align with apertures 125 in the carrier 45 to facilitate the attachment of the outer cover 75 to the carrier 45. Thus, the outer cover 75 is fixedly attached to the carrier 45 and to the handlebars 25. It should be noted that FIG. 5 illustrates a left side riser 35, while FIG. 6 illustrates a right side outer cover 75. Thus, the outer cover 75 illustrated in FIG. 5 is a substantial mirror image of the outer cover 75 illustrated in FIG. 6.

The inner cover 80, illustrated in FIG. 7, is a substantially cylindrical tube that is sized to fit within the outer cover 75. The inner cover 80 is sized to pass through both the top and bottom apertures 90,95 of the outer cover 75. The inner cover 80 includes a bottom surface 130 that is substantially normal to the riser axis 85 and defines a bottom aperture 135. The bottom aperture 135 is defined by two substantially parallel side surfaces 140 that are disposed opposite one another and two arcuate surfaces 145 disposed opposite one another to connect the two parallel surfaces 140. The top of the inner cover 80 is open to allow for the insertion of a collar 150 and a riser post 155.

Figure 8:
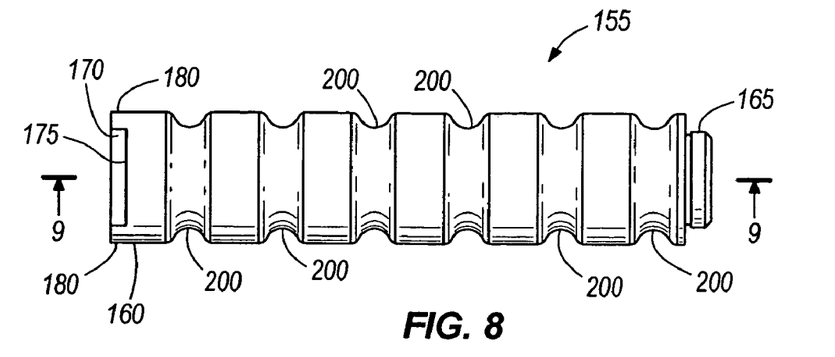
FIG. 8 is a side view of a riser post of FIG. 5.
Figure 9:
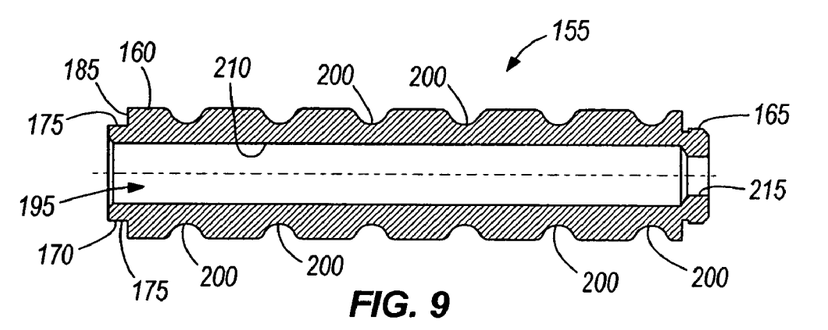
FIG. 9 is a section view of the riser post of FIG. 5 taken along line 9-9 of FIG. 8.

The riser post 155, illustrated in FIGS. 8 and 9, is a substantially cylindrical member having an attachment end 160 and a wiper end 165. The attachment end 160 includes an extension 170 that includes two parallel side surfaces 175 disposed opposite one another and two arcuate surfaces 180 disposed opposite one another and connecting the two side surfaces 175. The extension 170 cooperates with the remainder of the attachment end 160 to define a shoulder 185. The extension 170 is sized to fit within the bottom aperture 135 such that the shoulder 185 engages the bottom surface 130 of the inner cover 80. A bolt 190, illustrated in FIGS. 3 and 14-17, threads into the riser post 155 to fixedly attach the riser post 155 to the motorcycle 10. The shoulder 185 sandwiches the inner cover 80 between the riser post 155 and the steering assembly 20 such that the riser post 155 and the inner cover 80 are fixedly attached to the steering assembly 20 and are not movable relative to the steering assembly 20 of the motorcycle 10.

Figure 17:
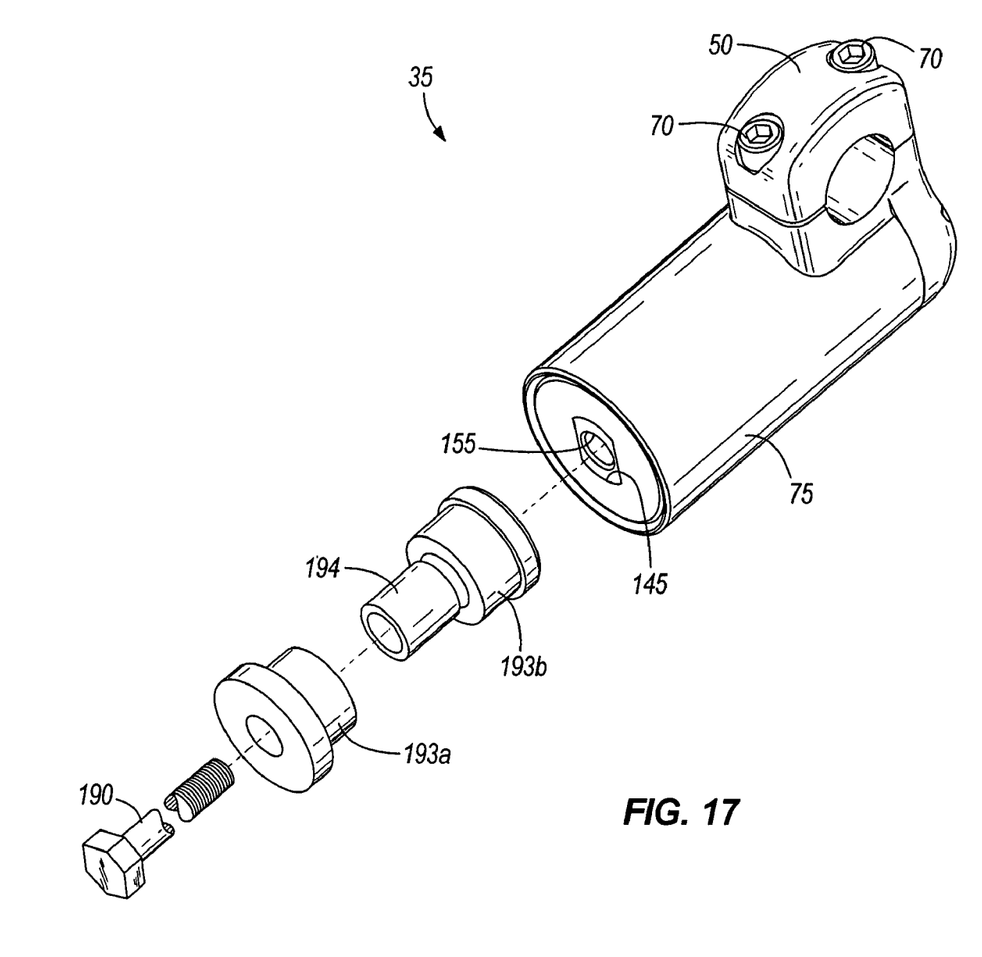
FIG. 17 is a perspective view of the riser of FIG. 1 including an upper bushing, a lower bushing, and a liner.

With reference to FIG. 17, the attachment of the risers 35, 40 will be explained in more detail. Generally, the motorcycle 10 includes a triple clamp 191 (shown in FIGS. 1 and 2) that facilitates the attachment of the handlebar 25 to a pair of front forks 192 of the steering assembly 20. When a standard (non-adjustable) riser is employed, two resilient bushings (not shown) are disposed within apertures in the triple clamp 191 and serve to isolate the riser and handlebar from vibrations in the road. A metallic liner passes through apertures in the resilient bushings and separates the bolt 190 from the bushings. Experimentation has shown that a slightly different arrangement improves the handling characteristics of the motorcycle 10 when the adjustable risers 35, 40 are employed. The arrangement, illustrated in FIG. 17, includes a lower bushing 193a, an upper bushing 193b, and a liner 194. The lower bushing 193a and the upper bushing 193b are shaped to fit within the apertures of preexisting triple clamps 191. As such, the upper bushing 193b and the lower bushing 193a look much like the resilient bushings employed with standard risers. The lower bushing 193a is manufactured from a resilient material such as rubber, much the same as the resilient bushings employed with standard risers. The upper bushing 193b is manufactured from a less resilient material, with metals (e.g., steel, brass, bronze, stainless steel, and the like) being preferred. Of course, other materials such as composites, plastics, ceramics, and the like may also be suitable for use in making upper bushings 193b. The stiffness and reduced resilience of the upper bushing 193b improves the handling of the motorcycle 10, particularly when the adjustable risers 35, 40 are fully extended. The reduced deflection of the upper bushing 193b allows for more precise steering control and a better steering "feel" then what can be achieved with the adjustable risers 35, 40 using the resilient bushings employed with standard risers.

As with the standard assembly, the liner 194 fits within apertures in the upper bushing 193b and the lower bushing 193a and inhibits contact between the bolt 190 and the lower and upper bushings 193a, 193b. In most constructions, a metallic liner 194 (e.g., steel, brass, bronze, stainless steel, and the like) can be employed with other materials (e.g., plastics, composites, ceramics, other metals, etc.) also being suitable for use.

The riser post 155 also includes a central bore 195 and a plurality of grooves 200 that are spaced apart from one another along the riser axis 85. Each groove 200 extends around the circumference of the riser post 155 and has an arcuate cross-section (generally a portion of a circular arc). Each groove 200 is sized and shaped to receive a plurality of ball bearings 205 as will be described with regard to FIGS. 14-15. The illustrated riser post 155 includes six grooves 200. However, riser posts 155 with more than six grooves 200 or fewer than six grooves 200 are possible. The central bore 195 includes a large diameter portion 210 that extends from the attachment end 160 to near the wiper end 165, and a small diameter portion 215 that extends from the end of the large diameter portion to the wiper end 165. A portion of the large diameter bore near the attachment end 160 includes threads that receive the threaded bolt 190 and attach the riser post 155 to the steering assembly 20.

Figure 10:
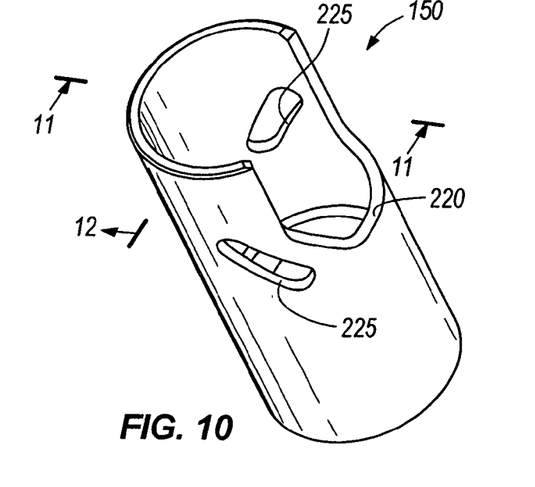
FIG. 10 is a perspective view of a collar of the right side riser of FIG. 3.
Figure 11:
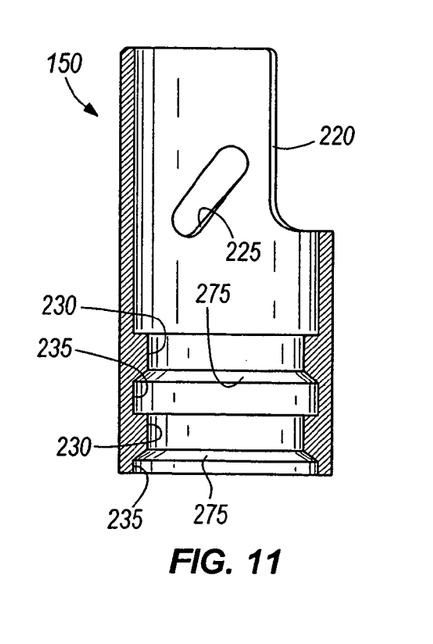
FIG. 11 is a section view of the collar of FIG. 10 taken along line 11-11 of FIG. 10.
Figure 12:
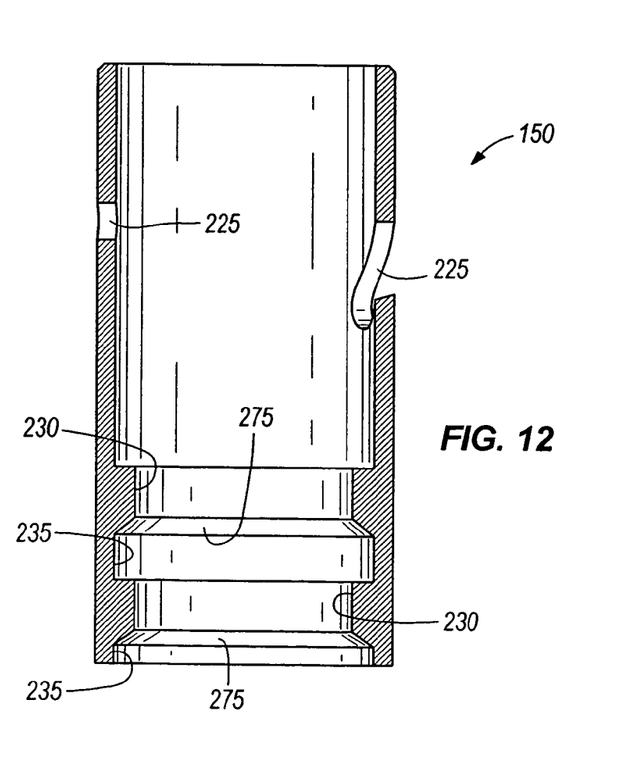
FIG. 12 is a section view of the collar of FIG. 10 taken along line 12-12 of FIG. 10.

The collar 150, illustrated in FIGS. 10-12, includes a substantially cylindrical outer wall that is open at both ends and that is sized to fit within the inner cover 80. The collar includes a U-shaped slot 220 disposed near the top of the collar 150. The U-shaped slot 220 is sized and positioned to receive the carrier extension 60 and is wide enough to allow rotation of the collar 150 relative to the carrier 45. Two substantially oval slots 225 are formed in the outer wall opposite one another. Each slot 225 follows a substantially helical path along the wall such that as the slot 225 extends around the circumference, it also extends axially along the riser axis 85. It should be noted that FIG. 5 illustrates a left side riser 35, while FIGS. 10-12 illustrate a right side collar 150. Thus, the collar 150 illustrated in FIG. 5 is a substantial mirror image of the collar 150 illustrated in FIGS. 10-12.

The collar 150 includes an inner surface that defines two reduced-diameter portions 230 and two pockets 235. The reduced diameter portions 230 are spaced apart from one another along the riser axis 85 a distance that is substantially equal to the distance between adjacent grooves 200 of the riser post 155. Similarly, the pockets 235 are spaced apart from one another along the riser axis 85 a distance that is substantially equal to the distance between adjacent grooves 200 of the riser post 155.

As shown in FIG. 12, the lever 55 is fixedly attached to the outer surface of the collar 150. In preferred constructions, the lever 55 is welded to the collar 150. However, other constructions may use fasteners or other suitable attachment means to fixedly attach the lever 55 to the collar 150.

Figure 13:
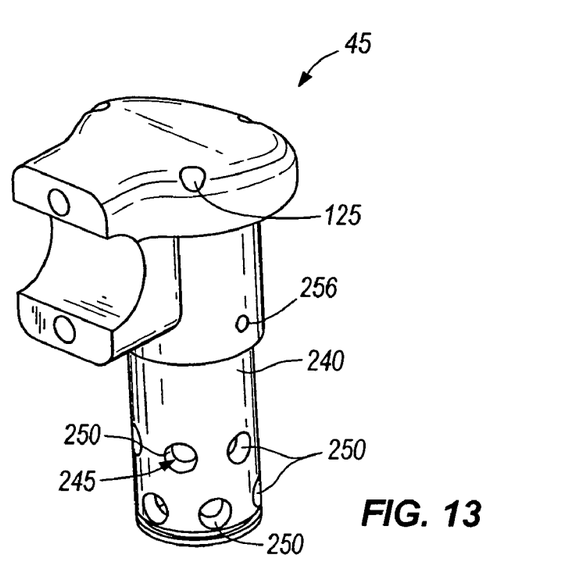
FIG. 13 is a perspective view of a carrier of FIG. 5.

The carrier 45, shown in FIGS. 5 and 13 includes a tail portion 240 that extends along the riser axis 85 to substantially define a hollow interior 245. In addition, several apertures 250 are formed around the circumference of the tail portion 240. The apertures 250 are arranged in two rows that are spaced apart from one another along the riser axis 85 a distance that is substantially equal to the distance between the riser post grooves 200. Each aperture 250 is tapered such that it has a small diameter near the innermost surface of the tail portion 240 and a larger diameter near the outermost surface of the tail portion 240. The smallest diameter is sized to inhibit the passage of the ball bearing 205, while still allowing a portion of the ball bearing 205 to extend into the hollow interior 245.

The tail portion 240 fits over the riser post 155 such that at least a portion of the riser post 155 is positioned within the hollow interior 245. The ball bearings 205 are sized and positioned such that when pushed inward, they each extend through one of the apertures 250 and are able to extend into one of the grooves 200 formed on the riser post 155.

The tail portion 240 extends into the collar 150 such that at least a portion of the tail portion 240 is disposed within the collar 150. As shown in FIG. 5, two collar pins 255 engage pin apertures 256 (shown in FIG. 13) formed in the carrier 45 and extend outward along an axis that is substantially normal to the riser axis 85. Each collar pin 255 fits within one of the oval slots 225 formed in the outer wall of the collar 150. Thus, the collar 150 is coupled to the carrier 56 but is both rotatable about the riser axis 85 and translatable along the riser axis 85 relative to the carrier. More specifically, rotation of the collar 150 will produce both rotation of the collar 150 and translation of the collar 150 along the riser axis 85 as the collar pins 255 move along the oval slots 225. It should be noted that while two collar pins 255 disposed along a common axis have been described, other constructions may use only one pin 255, or more than two pins 255. In addition, there is no requirement that the two 255 be located along a common axis, as the invention will function with pins 255 spaced apart by angles other than 180 degrees.

Figure 14:
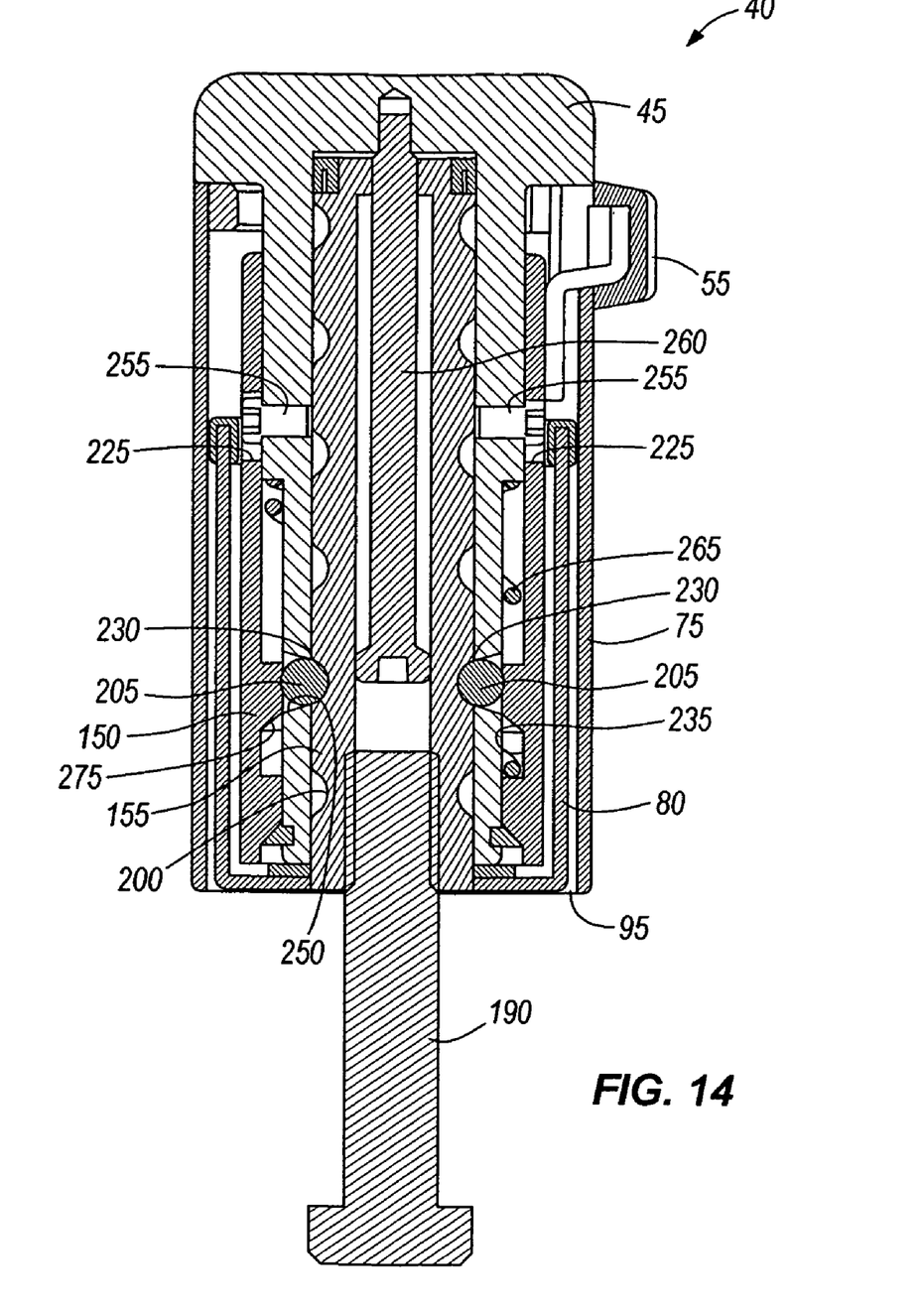
FIG. 14 is a section view of the right side riser taken along line 14-14 of FIG. 3 in an engaged position.

With the riser post 155, collar 150, and carrier 45 positioned in an engaged position, the small diameter portions 230 of the collar 150 engage the ball bearings 205 and force them inward, as shown in FIG. 14. Each of the ball bearings 205 extends through one of the tapered apertures 250 and engages one of the grooves 200 formed in the riser post 155. Thus, the carrier 45 is engaged with the riser post 155 and cannot move relative to the riser post 155. However, when the collar 150 is rotated to a disengaged position (FIG. 16), it moves vertically upward along the riser axis 85. As the collar 150 moves up, the small diameter portions 230 disengage from the ball bearings 205 and the pockets 235 move into alignment with the ball bearings 205. The pockets 235 provide enough space for the ball bearings 205 such that they are free to move out of engagement with the riser post 155. Thus, the carrier 45 can be moved relative to the riser post 155.

To guide the movement of the carrier 45 relative to the riser post 155, a guide bolt 260 is engaged with the carrier 45 and is positioned at least partially within the large bore 210 of the riser bolt 155. The guide bolt 260 moves along the bore 210 to maintain the desired alignment between the carrier 45 and the riser post 155.

A biasing member, such as a coil spring 265, is positioned between the carrier 45 and the collar 150. The spring 265 provides a force that tends to push the collar 150 downward or toward the engaged position. As such, the spring 265 maintains the riser 35, 40 in the engaged configuration, thus requiring user action (movement of the levers 55) to move the riser 35,40 to the disengaged position.

Figure 15:
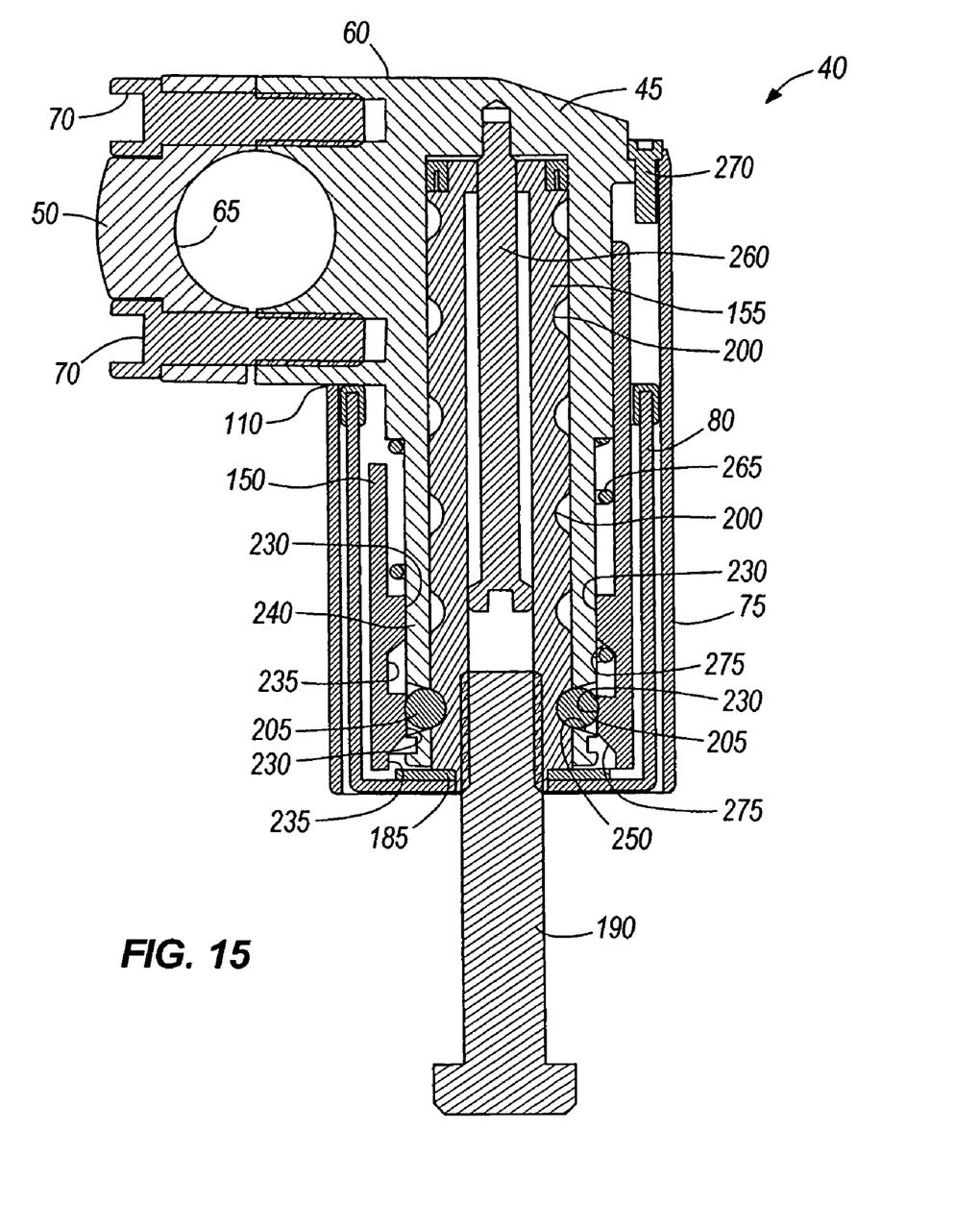
FIG. 15 is a section view of the right side riser taken along line 15-15 of FIG. 3 in an engaged position.
Figure 16:
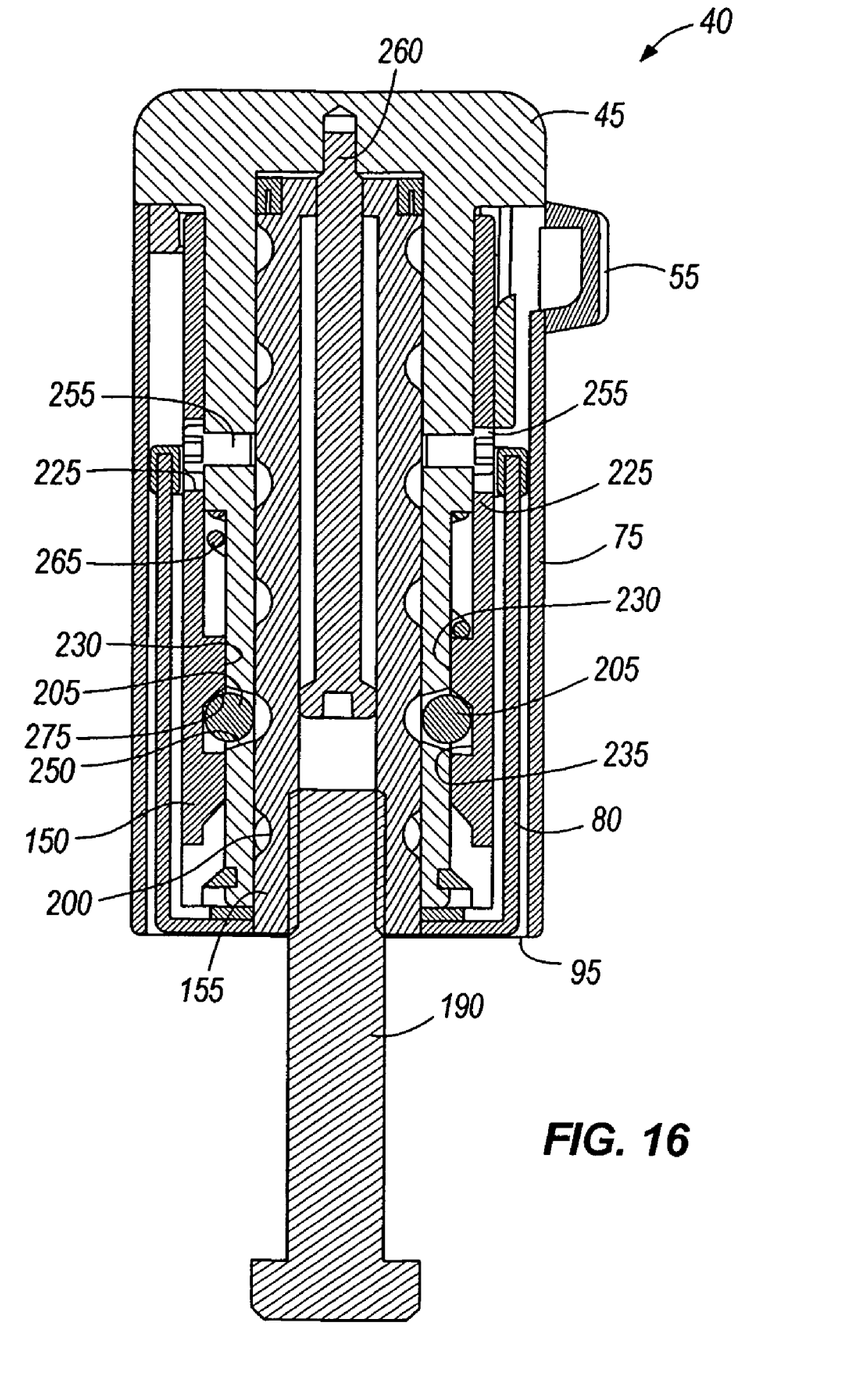
FIG. 16 is a section view of the right side riser taken along line 14-14 of FIG. 3 with the riser in a released position.

With reference to FIGS. 14-17 the assembly and operation of the risers 35, 40 will be described. As shown in FIG. 15, the clamp 50 and carrier 45 attach to one another to define the handlebar-receiving aperture 65. The outer cover 75 also attaches to the carrier 45 using three screws 270. As shown in FIG. 14, the collar 150 is also attached to the carrier 45. However, unlike the outer cover 75, the collar 150 can move relative to the carrier 45. The riser post 155 is fixedly attached to the steering assembly 20 via the bolt 190. The bolt 190 also fixedly attaches the inner cover 80 to the steering assembly 20. Thus, the riser post 155 and inner cover 80 are fixed relative to the steering assembly 20. The carrier 45 supports two rows of ball bearings 205 that allow the carrier 45 to be locked in position relative to the riser post 155 or to move relative to the riser post 155.

In operation, the right side riser 40 is attached to the right side of the steering mechanism 20 and the left side riser 35 is attached to the left side of the steering mechanism 20. Before attaching the risers, 35, 40 to a motorcycle 10 that includes a standard riser, the user should first remove the upper bushing and the lower bushing from the triple clamp 191 and replace them with the upper bushing 193*b*, lower bushing 193*a*, and liner 194 illustrated in FIG. 17. If the risers 35, 40 are being attached to a new motorcycle 10, the removal of the old bushings is unnecessary and the new upper bushing 193*b*, lower bushing 193*a*, and liner 194 can be positioned as illustrated in FIG. 17. The bolt 190 extends through the apertures in the bushings 193*a*, 193*b* and in the triple clamp 191 and extends above a mounting surface. The bolt 190 is threaded into the riser post 155 to clamp the riser post 155 and the inner cover 80 to the mounting surface of the steering assembly 20. The handlebars 25 are clamped to both risers 35, 40 and the risers, 35, 40 the collars 150, and the outer covers 75 are assembled such that they are movable with respect to the steering assembly 20 to allow the rider to position the handlebars 25 as desired.

To adjust the height of the handlebars 25, the user actuates both levers 55. Generally, a small angular rotation of the levers 55 about the riser axis 85 is all that is needed to move the collar 150 from the engaged to the disengaged position. In preferred constructions, the angle is less than thirty degrees, with other angles also being possible. In the illustrated construction, a 28-degree rotation is needed to move the collar 150 between the engaged and disengaged positions. As the collar 150 rotates, the collar pins 255 follow the oval slots 255, thus forcing the collar 150 to move axially upward along the riser axis 85. As the collar 150 moves upward, each row of ball bearings 205 moves from a small diameter portion 230 into a pocket 235. Once aligned with the pocket, 235 the ball bearings 205 are free to fall into the pockets 235. At least a portion of each ball bearing 205 remains engaged with the tapered apertures 250 of the carrier 45. However, the balls 205 no longer extend into the grooves 200 of the riser post 155. As such, the carrier 45 is free to move up or down along the riser post 155.

Once the handlebars 25 are positioned as desired, the rider releases both levers 55. The spring 265 biases the collar 150 downward toward the engaged position. As the collar 150 moves downward, the balls 205 follow a tapered surface 275 that guides the balls 205 back into engagement with the small diameter portion 230. Once engaged with the small diameter portion 230, the ball bearings 205 are forced inward such that they extend through the carrier 45 and engage one of the grooves 200 formed in the riser post 155. If the rider releases the levers 55 with the handlebars 25 in a position in which the ball bearings 205 do not align with a groove 200, the handlebars 25 will remain free to move up or down until the ball bearings 205 engage a groove 200.

The illustrated construction employs two rows of ball bearings 205 to provide increased strength to the riser 35, 40. While maintaining a desired riser size. However, other constructions may employ a single row of ball bearings 205 or may employ more than two rows of ball bearings 205. In addition, to the number of rows of ball bearings, 205 other constructions may vary the quantity of ball bearings 205 in each row or the size of the ball bearings 205 to achieve the desired strength. As such, many different quantities of ball bearings, 205 sizes of ball bearings, 205 and number of rows of ball bearings 205 may be employed and are contemplated by the invention.

Thus, the invention provides, among other things, a new and useful riser 35, 40 for a motorcycle 10. More particularly, the invention provides a new and useful riser 35, 40 that allows the rider to adjust the height of the handlebars 25 of the motorcycle 10. Various features and advantages of the invention are set forth in the following claims.

What is claimed is:

1. A riser for a motorcycle having a front wheel coupled to a steering assembly that is movable to pivot the front wheel and steer the motorcycle, the riser comprising:
   a first portion adapted to be coupled to the steering assembly and defining an axis;
   a carrier adapted to clamp the handlebar such that the carrier and the handlebar are fixedly attached to one another; and
   a locking member interconnecting the first portion and the carrier and movable between an engaged position, where the position of the carrier is fixed relative to the first portion and a released position, where the carrier is movable along the axis relative to the first portion, the locking member including a plurality of balls that are movable between an engaged position and a disengaged position.

2. The riser of claim 1, wherein the balls are spaced apart from one another along the axis to define at least two rows of balls.

3. The riser of claim 1, wherein at least a portion of the locking member rotates about the axis to move the locking member between the engaged position and the released position.

4. The riser of claim 1, further comprising a biasing member that biases the locking member toward the engaged position.

5. The riser of claim 1, wherein the first portion includes a riser post that defines a plurality of fixed, discrete handlebar setpoints spaced apart from one another along the axis.

6. The riser of claim 5, wherein the handlebar setpoints each include an arcuate groove that extends around a circumference of the riser post.

7. The riser of claim 1, wherein the first portion includes a lower bushing and an upper bushing that are adapted to engage the steering assembly, wherein one of the upper bushing and the lower bushing is substantially less resilient than the other of the upper bushing and the lower bushing.

8. The riser of claim 7, wherein the lower bushing is manufactured from a resilient material and the upper bushing is manufactured from a metal.

9. A motorcycle comprising:
   a front wheel,
   a steering assembly including a handlebar that is movable to pivot the front wheel and steer the motorcycle, and
   a riser adapted to support the handlebar, the riser including:
      a first portion coupled to the steering assembly and defining a first axis;
      a first carrier adapted to clamp the handlebar such that the carrier and the handlebar are fixedly attached to one another;
      a second portion coupled to the steering assembly and defining a second axis, the second axis spaced apart from and substantially parallel to the first axis;
      a second carrier adapted to clamp the handlebar such that the second carrier and the second handlebar are fixedly attached to one another, the first carrier and the second carrier movable along the first axis and the second axis respectively to adjust the position of the handlebar relative to the first portion and the second portion;
      a first locking member interconnecting the first portion and the first carrier; and
      a second locking member interconnecting the second portion and the second carrier, the first locking member and the second locking member each movable between an engaged position and a released position, when in the engaged position the positions of the first carrier and the second carrier are fixed relative to the first portion and the second portion respectively, and when in the released position the first carrier and the second carrier are movable along the first axis and the second axis relative to the first portion and the second portion respectively.

10. The motorcycle of claim 9, wherein each of the locking members includes a plurality of balls that are movable between an engaged position and a disengaged position.

11. The motorcycle of claim 10, wherein the balls are spaced apart from one another along the respective axes to define at least two rows of balls.

12. The motorcycle of claim 9, wherein at least a portion of the first locking member rotates about the first axis and at least a portion of the second locking member rotates about the second axis to move first and second locking members between their respective engaged positions and released positions.

13. The motorcycle of claim 9, further comprising a first biasing member that biases the first locking member toward the engaged position, and a second biasing member that biases the second locking member toward the engaged position.

14. The motorcycle of claim 9, wherein each of the first portion and the second portion includes a riser post that defines a plurality of fixed, discrete handlebar setpoints spaced apart from one another along the respective axes.

15. The motorcycle of claim 14, wherein the handlebar setpoints each include an arcuate groove that extends around a circumference of the riser post.

16. The motorcycle of claim 9, wherein the second portion and the second carrier are substantial mirror images of the first portion and the first carrier respectively.

17. The motorcycle of claim 9, wherein the steering assembly includes a triple clamp and the first portion includes a lower bushing and an upper bushing that engage the triple clamp, wherein one of the upper bushing and the lower bushing is substantially less resilient than the other of the upper bushing and the lower bushing.

18. The motorcycle of claim 17, wherein the lower bushing is manufactured from a resilient material and the upper bushing is manufactured from a metal.

19. A motorcycle comprising:
a front wheel,
a steering assembly including a triple clamp and a handlebar that is movable to pivot the front wheel and steer the motorcycle, and
a riser adapted to support the handlebar, the riser including:
a first portion coupled to the steering assembly and defining a first axis, the first portion including a lower bushing and an upper bushing that engage the triple clamp, one of the upper bushing and the lower bushing being substantially less resilient than the other of the upper bushing and the lower bushing;
a first carrier adapted to clamp the handlebar such that the carrier and the handlebar are fixedly attached to one another;
a second portion coupled to the steering assembly and defining a second axis, the second axis spaced apart from and substantially parallel to the first axis; and
a second carrier adapted to clamp the handlebar such that the second carrier and the second handlebar are fixedly attached to one another, the first carrier and the second carrier being movable along the first axis and the second axis respectively to adjust the position of the handlebar relative to the first portion and the second portion.

* * * * *